US010940750B2

(12) United States Patent
Pan et al.

(10) Patent No.: US 10,940,750 B2
(45) Date of Patent: Mar. 9, 2021

(54) HYBRID ALL-WHEEL DRIVE SYSTEM HAVING DYNAMIC CLUTCHES

(71) Applicants: THE REGENTS OF THE UNIVERSITY OF MICHIGAN, Ann Arbor, MI (US); ROBERT BOSCH GMBH, Stuttgart (DE)

(72) Inventors: Ziheng Pan, Ann Arbor, MI (US); Huei Peng, Ann Arbor, MI (US); Nikhil Ravi, Redwood City, CA (US)

(73) Assignees: THE REGENTS OF THE UNIVERSITY OF MICHIGAN, Ann Arbor, MI (US); Robert Bosch GmbH, Stuttgart (DE)

( * ) Notice: Subject to any disclaimer, the term of this patent is extended or adjusted under 35 U.S.C. 154(b) by 300 days.

(21) Appl. No.: 15/763,722

(22) PCT Filed: Oct. 27, 2016

(86) PCT No.: PCT/US2016/059011
§ 371 (c)(1),
(2) Date: Mar. 27, 2018

(87) PCT Pub. No.: WO2017/075148
PCT Pub. Date: May 4, 2017

(65) Prior Publication Data
US 2018/0290534 A1   Oct. 11, 2018

Related U.S. Application Data

(60) Provisional application No. 62/246,744, filed on Oct. 27, 2015, provisional application No. 62/246,753, filed on Oct. 27, 2015.

(51) Int. Cl.
*B60K 6/52*   (2007.10)
*B60K 6/365*   (2007.10)
(Continued)

(52) U.S. Cl.
CPC .................. *B60K 6/52* (2013.01); *B60K 6/26* (2013.01); *B60K 6/365* (2013.01); *B60K 6/387* (2013.01);
(Continued)

(58) Field of Classification Search
CPC .... B60K 17/34; B60K 17/344; B60K 17/356; B60K 2006/381; B60K 23/08; B60K 6/26;
(Continued)

(56) References Cited

U.S. PATENT DOCUMENTS 7,040,433 B2   5/2006   Yamamoto et al.
7,497,285 B1   3/2009   Radev
(Continued)

FOREIGN PATENT DOCUMENTS

CN   1154680 A   7/1997
CN   101451596 A   6/2009
(Continued)

OTHER PUBLICATIONS

International Search Report and Written Opinion of the International Searching Authority issued in PCT/US2016/059011, dated Feb. 13, 2017; ISA/KR.
(Continued)

*Primary Examiner* — Roger L Pang
(74) *Attorney, Agent, or Firm* — Harness, Dickey & Pierce, P.L.C.

(57) ABSTRACT

An All-Wheel-Drive (AWD), multi-mode, power-split hybrid vehicle employing a drive combining all electric motors and an internal combustion engine, together collocated on a 2-planetary-gear (PG) set. The present teachings are capable of delivering competitive performance while maximizing fuel economy through power-split hybrid design.

7 Claims, 8 Drawing Sheets

(51) Int. Cl.
*F16H 3/72* (2006.01)
*B60K 6/387* (2007.10)
*B60K 6/442* (2007.10)
*B60K 17/356* (2006.01)
*B60K 17/34* (2006.01)
*B60K 6/445* (2007.10)
*B60K 6/26* (2007.10)
*B60K 6/543* (2007.10)
*B60K 17/344* (2006.01)
*B60K 6/38* (2007.10)
*B60K 23/08* (2006.01)
*F16H 3/44* (2006.01)

(52) U.S. Cl.
CPC .............. *B60K 6/442* (2013.01); *B60K 6/445* (2013.01); *B60K 6/543* (2013.01); *B60K 17/34* (2013.01); *B60K 17/344* (2013.01); *B60K 17/356* (2013.01); *F16H 3/728* (2013.01); *B60K 23/08* (2013.01); *B60K 2006/381* (2013.01); *B60Y 2200/92* (2013.01); *B60Y 2400/73* (2013.01); *B60Y 2400/82* (2013.01); *F16H 2003/442* (2013.01); *F16H 2200/2007* (2013.01); *F16H 2200/2038* (2013.01); *Y02T 10/62* (2013.01); *Y10S 903/906* (2013.01); *Y10S 903/911* (2013.01); *Y10S 903/914* (2013.01); *Y10S 903/916* (2013.01); *Y10S 903/918* (2013.01)

(58) Field of Classification Search
CPC ........ B60K 6/365; B60K 6/387; B60K 6/442; B60K 6/445; B60K 6/52; B60K 6/543; B60Y 2200/92; B60Y 2400/73; B60Y 2400/82; F16H 3/727; F16H 3/728; Y02T 10/6234; Y02T 10/6239; Y02T 10/6265; Y10S 903/906; Y10S 903/911; Y10S 903/914; Y10S 903/916; Y10S 903/918
See application file for complete search history.

(56) References Cited

U.S. PATENT DOCUMENTS

| | | |
|---|---|---|
| 8,535,189 B2 | 9/2013 | Yoshimura |
| 8,545,353 B2 | 10/2013 | Boskovitch et al. |
| 8,812,197 B2 | 8/2014 | Itou et al. |
| 8,888,638 B2 | 11/2014 | Mueller et al. |
| 9,014,890 B2 | 4/2015 | Kwon et al. |
| 2006/0046886 A1* | 3/2006 | Holmes .................. B60K 6/387 475/5 |
| 2007/0093341 A1 | 4/2007 | Supina et al. |
| 2010/0258370 A1 | 10/2010 | Naik et al. |
| 2011/0070992 A1 | 3/2011 | Si |
| 2011/0276241 A1 | 11/2011 | Nakao |
| 2011/0319211 A1* | 12/2011 | Si ............................. F16H 3/728 475/5 |
| 2012/0083950 A1* | 4/2012 | Yang .................... B60W 10/08 701/22 |
| 2012/0228040 A1 | 9/2012 | Kyle |
| 2012/0322602 A1 | 12/2012 | Kim et al. |
| 2013/0053201 A1* | 2/2013 | Holmes .................. B60K 6/445 475/5 |
| 2013/0151057 A1* | 6/2013 | Matsubara ............ B60W 20/00 701/22 |
| 2013/0296101 A1 | 11/2013 | Doering et al. |
| 2013/0324359 A1 | 12/2013 | Sasaki et al. |
| 2014/0051538 A1 | 2/2014 | Wenthen et al. |
| 2014/0051546 A1 | 2/2014 | Maruyama et al. |
| 2014/0121870 A1 | 5/2014 | Lee |
| 2014/0228167 A1 | 8/2014 | Frank et al. |
| 2014/0296013 A1 | 10/2014 | Hata et al. |

FOREIGN PATENT DOCUMENTS

| | | |
|---|---|---|
| CN | 201633523 U | 11/2010 |
| CN | 202242941 U | 5/2012 |
| CN | 103738154 A | 4/2014 |
| CN | 203611726 U | 5/2014 |
| CN | 104175858 A | 12/2014 |
| EP | 2540590 A1 | 1/2013 |
| JP | 2005029118 A | 2/2005 |
| JP | 2013203385 A | 10/2013 |
| JP | 2014072933 A | 4/2014 |
| WO | 2010079604 A1 | 7/2010 |
| WO | WO-2013017219 A1 | 2/2013 |

OTHER PUBLICATIONS

Extended European Search Report, European Application No. 16860753.9, dated May 23, 2019, 8 pages.

* cited by examiner

| Operating Mode | Ratios | 36 | 38 | 40 |
|---|---|---|---|---|
| AWD Power-split | EVT | X | | |
| AWD EV / AWRB | N/A | | X | |
| RWD Series | EVT | | | X |
| AWD Parallel | 1.00 | X | X | |
| AWD Parallel (backward) | -0.5 | | X | X |

(X = Engaged Clutch)   Ratios: engine speed / output speed.

Sample Design
$\frac{\text{Ring Gear}}{\text{Sun Gear}}$ Tooth Ratio:

$\frac{N_{R1}}{N_{S1}} = 2$ $\frac{N_{R2}}{N_{S2}} = 2$

| Operating Mode | Ratios | 36 | 38 | 40 |
|---|---|---|---|---|
| AWD Power-split | EVT | X | | |
| AWD EV / AWRB | N/A | | X | |
| RWD Series | EVT | | | X |
| AWD Parallel | 1.00 | X | X | |
| AWD Parallel (backward) | -0.5 | | X | X |

(X = Engaged Clutch)    Ratios: engine speed / output speed.

Sample Design:
$\frac{\text{Ring Gear}}{\text{Sun Gear}}$ Tooth Ratio:

$\frac{N_{R1}}{N_{S1}} = 2$ $\frac{N_{R2}}{N_{S2}} = 2$

| Operating Mode | Ratios | 36 | 38 | 40 |
|---|---|---|---|---|
| AWD Power-split | EVT | X | | |
| AWD EV / AWRB | N/A | | X | |
| RWD Series | EVT | | | X |
| AWD Parallel | 1.00 | X | X | |
| AWD Parallel (backward) | -2.00 | | X | X |

(X = Engaged Clutch)   Ratios: engine speed / output speed.

Sample Design:
$\frac{\text{Ring Gear}}{\text{Sun Gear}}$ Tooth Ratio:

$\frac{N_{R1}}{N_{S1}} = 2$ $\frac{N_{R2}}{N_{S2}} = 2$

| Operating Mode | Ratios | 36 | 38 | 40 |
|---|---|---|---|---|
| AWD Power-split | EVT | X | | |
| AWD EV / AWRB | N/A | | X | |
| RWD Series | EVT | | | X |
| AWD Parallel | 1.00 | X | X | |
| AWD Parallel (backwards) | -2.00 | | X | X |

(X = Engaged Clutch)   Ratios: engine speed / output speed.

Sample Design:
$\frac{Ring\ Gear}{Sun\ Gear}$ Tooth Ratio:

$\frac{N_{R1}}{N_{S1}} = 2$ $\frac{N_{R2}}{N_{S2}} = 2$

| Operating Mode | Ratios | 36 | 38 | 40 |
|---|---|---|---|---|
| AWD Power-split | EVT | X | | |
| RWD Series | EVT | | X | |
| AWD EV / AWRB | N/A | | | X |
| AWD Parallel | 0.67 | X | | X |
| AWD Parallel | 1.00 | X | X | |
| RWD Parallel (backward) | -0.50 | | X | X |

(X = Engaged Clutch)   Ratios: engine speed / output speed.

Sample Design:

$\frac{Ring\ Gear}{Sun\ Gear}$ Tooth Ratio:

$\frac{N_{R1}}{N_{S1}} = 2$ $\frac{N_{R2}}{N_{S2}} = 2$

| Operating Mode | Ratios | 36 | 38 | 40 |
|---|---|---|---|---|
| AWD Power-split | EVT | X | | |
| RWD Series | EVT | | X | |
| AWD EV / AWRB | N/A | | | X |
| AWD Parallel | 0.67 | X | | X |
| AWD Parallel | 1.00 | X | X | |
| RWD Parallel | -2.00 | | X | X |

(X = Engaged Clutch)   Ratios: engine speed / output speed.

Sample Design:
$\frac{\text{Ring Gear}}{\text{Sun Gear}}$ Tooth Ratio:

$\frac{N_{R1}}{N_{S1}} = 2$ $\frac{N_{R2}}{N_{S2}} = 2$

| Operating Mode | Ratios | 36 | 38 | 40 |
|---|---|---|---|---|
| AWD Power-split | EVT | X | | |
| RWD Series | EVT | | X | |
| AWD EV / AWRB | N/A | | | X |
| AWD Parallel | 0.33 | X | | X |
| AWD Parallel | 1.00 | X | X | |
| RWD Parallel (backward) | -2.00 | | X | X |

(X = Engaged Clutch)    Ratios: engine speed / output speed.

Sample Design:
$\frac{\text{Ring Gear}}{\text{Sun Gear}}$ Tooth Ratio:

$\frac{N_{R1}}{N_{S1}} = 2$ $\frac{N_{R2}}{N_{S2}} = 2$

HYBRID ALL-WHEEL DRIVE SYSTEM HAVING DYNAMIC CLUTCHES

CROSS REFERENCE TO RELATED APPLICATIONS

This application is a U.S. National Phase Application under 35 U.S.C. 371 of International Application No. PCT/US2016/059011 filed on Oct. 27, 2016 and published in English as WO 2017/075148 A1 on May 4, 2017. This application claims the benefit of U.S. Provisional Application No. 62/246,744, filed on Oct. 27, 2015 and U.S. Provisional Application No. 62/246,753, filed on Oct. 27, 2015. The entire disclosures of the above applications are incorporated herein by reference.

FIELD

The present disclosure relates to a hybrid all-wheel drive system having dynamic clutches.

BACKGROUND AND SUMMARY

This section provides background information related to the present disclosure which is not necessarily prior art. This section provides a general summary of the disclosure, and is not a comprehensive disclosure of its full scope or all of its features.

The present teachings provide an All-Wheel-Drive (AWD), multi-mode, power-split hybrid vehicle employing a drive combining all electric motors and an internal combustion engine, together collocated on a 2-planetary-gear (PG) set. It is a multi-mode power-split hybrid using PG set, and this configuration type has been found to achieve good fuel economy, such as Prius. Apart from conventional power-split hybrid vehicles, which have only one output shaft, the present teachings have two output shafts directly collocated. AWD, which is an essential feature for heavy or light-duty applications, is enabled for good performance, such as launching, tow, and grade. Independent torque control at the two output shafts is enabled so that performance can be maximized. The present teachings are capable of delivering competitive performance while maximizing fuel economy through power-split hybrid design. This is a great advantage compared to the past hybrid vehicle designs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION OF THE PREFERRED EMBODIMENTS

Figures 1A, 1B:
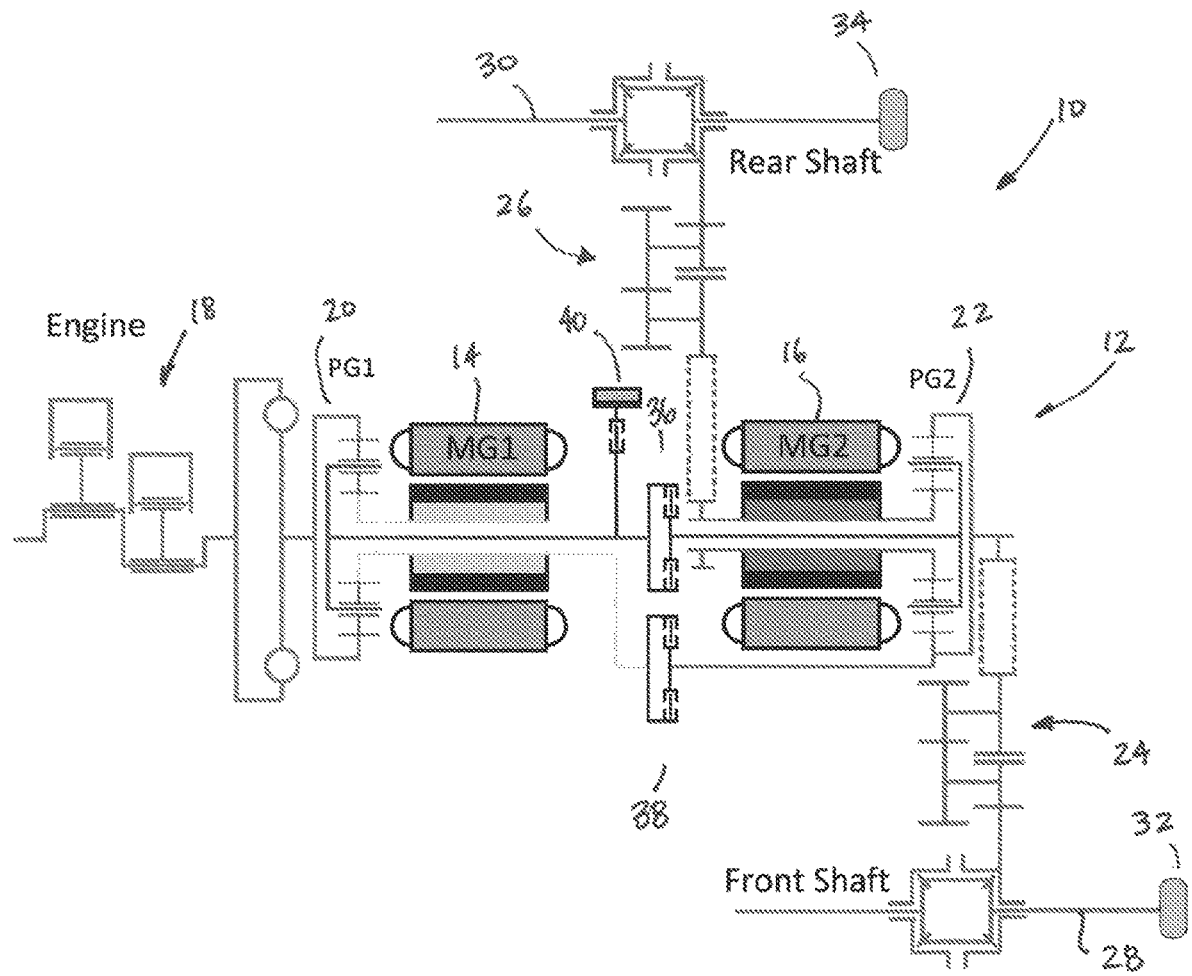
FIG. 1A is a schematic representation of a powertrain including an All-Wheel-Drive (AWD) multi-mode power-split design incorporating a family member of the present invention.
FIG. 1B is an operating mode table depicting some of the operating characteristics of the powertrain shown in FIG. 1A.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, as outlined herein, an All-Wheel-Drive (AWD), multi-mode, power-split hybrid vehicle 10 is provided employing a drive 12 combining all electric motors 14, 16 and an internal combustion engine 18, together collocated on a 2-planetary-gear (PG) set 20, 22. It is a multi-mode power-split hybrid using PG set, and this configuration type has been known to achieve good fuel economy, such as Prius. Apart from conventional power-split hybrid vehicles, which have only one output shaft, the present teachings have two output shafts, a front output shaft 24 and a rear output shaft 26, directly collocated for driving a front shaft 28 coupled to at least a front wheel 32 of the vehicle 10 and a rear shaft 30 coupled to at least a rear wheel 34 of the vehicle 10. AWD, which is an essential feature for heavy or light-duty applications, is enabled for good performance, such as launching, tow, and grade. Independent torque control at the two output shafts 36, 38 is enabled so that performance can be maximized. The present teachings are capable of delivering competitive performance while maintaining maximizing fuel economy through power-split hybrid design. This is a great advantage compared to the past hybrid vehicle designs.

The vehicle 10 of the present teachings may have various operating modes, including, but not limited to, power-split mode, pure electric mode, and parallel mode. Its operation can be optimized based on different environments.

In all the present embodiments, the vehicle comprises front wheels 32 and rear wheels 34. A gasoline internal combustion engine 18, and electric motors 14 and 16 are collocated on a 2-planetary-gear (PG) set. Three clutches are used in each embodiment.

Description of a First Exemplary Embodiment

With reference to FIG. 1A, a powertrain drive 12 is shown. The engine 18 is operably connected to the ring gear of a first PG mechanism 20, while electric motor 14 is connected to the sun gear of the first PG mechanism 20 and motor 16 is connected to the sun gear of a second PG mechanism 22.

Dynamic clutch 36 collocates with the carrier of the first PG mechanism 20 and the carrier of the second PG mechanism 22. Dynamic clutch 38 collocates with the sun gear of the first PG mechanism 20 and the ring gear of the second PG mechanism 22. Brake clutch 40 collocates with the carrier of the first PG mechanism 20. Ring gear of the second PG mechanism 22 outputs to the front wheels 32, while the sun gear of the second PG mechanism 22 outputs to the rear wheels 34. Status of dynamics clutches 36 and 38, together with a brake clutch 40, define the operating mode of this system. The operating mode table is presented in FIG. 1B.

The present teaching employs a power-split mode if clutch 36 is engaged while the other two clutches 38, 40 are disengaged. The engine 18 and motor 14 together drive the front wheels 32 and rear wheels 34. The motor 16 controls/adjusts output of the rear wheels 34, since they are directly collocated. Generally, rotational speed of the two output shafts 24 and 26 are the same. Rotational speed of the engine 18 can vary depending on the desired controlled operation.

The present teaching also employs a pure electric mode if clutch 38 is engaged while the other two clutches 36, 40 are disengaged. The motor 14 drives the front wheels 32 directly while the motor 16 controls the rear wheels 34. The engine 18 speed is free from wheel speeds and can be shut down. The vehicle is purely driven by two electric motors 14, 16 with AWD, and thus it operates as an electric vehicle.

The present teaching also employs a series mode with rear-wheel-drive (RWD) if clutch 40 is engaged, while clutch 36 and 38 are disengaged. The motor 16 controls/adjusts output of the rear wheels 34. The motor 14 is connected to the engine 18 and is operating as a generator generating electricity from the engine power.

The present teaching also employs a parallel mode if clutches 36 and 38 are engaged, while clutch 40 is disengaged. All the power components, the engine 18 and electric motors 14 and 16, are driving the two output shafts 24 and 26, and these components have the same rotational speed as the two output shafts. The operating status of the engine 18 can change by varying its acting torque. The vehicle operates like a parallel hybrid in this mode.

The present teaching also employs an operating mode that the vehicle can drive backward while the engine 18 is on. Brake clutch 40 and clutch 38 are engaged, and clutch 36 is disengaged. The engine 18 and motor 14 are driving the front wheels 32. In the driving backward case, the engine 18 still rotates in the positive direction because of the engagement of the brake clutch 40, even when the front wheels 32 has negative rotational speed. The motor 16 drives the rear wheels 34 respectively.

Description of a Second Exemplary Embodiment

Figures 2A, 2B:
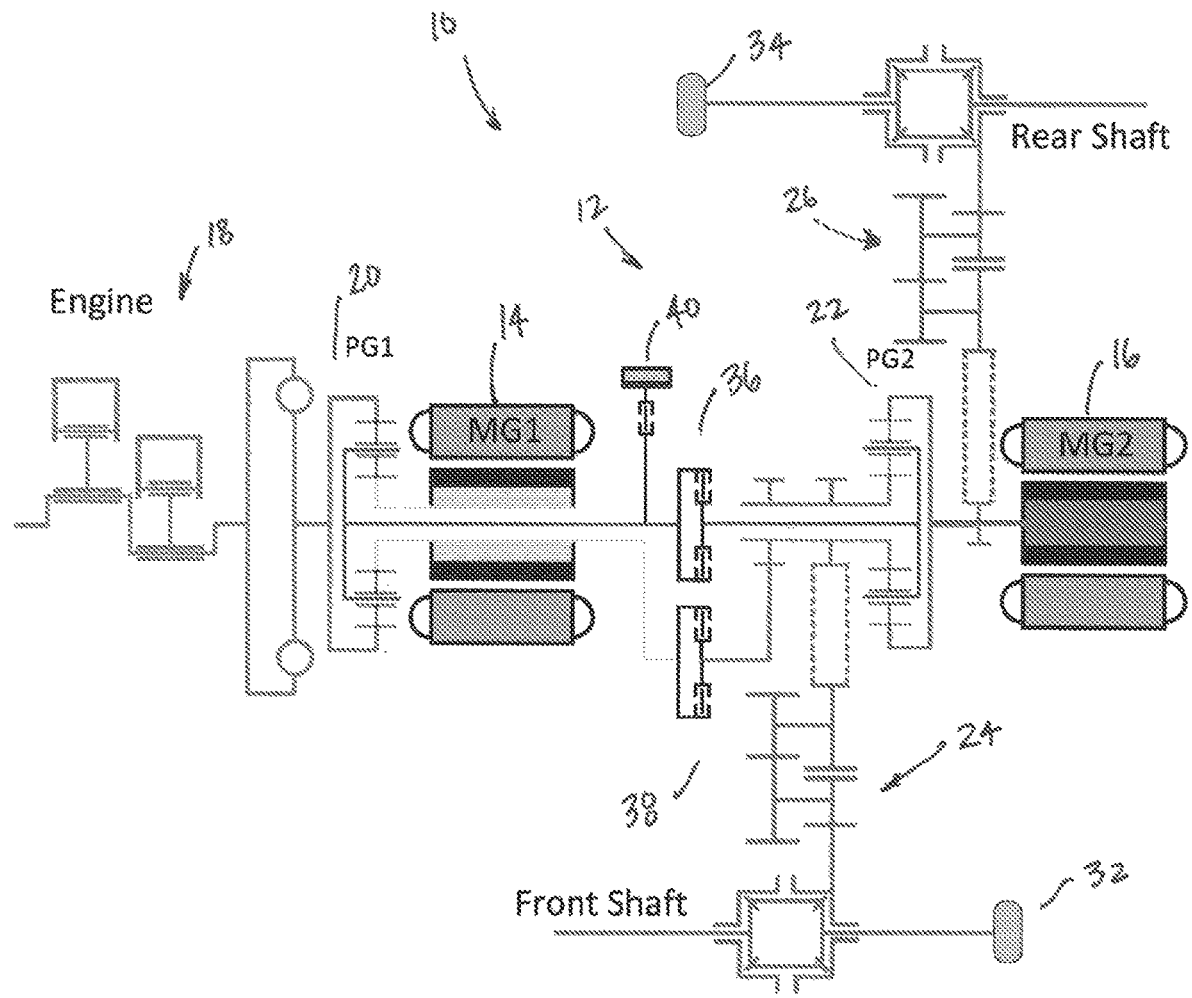
FIG. 2A is a schematic representation of a powertrain including an All-Wheel-Drive (AWD) multi-mode power-split design incorporating a family member of the present invention.
FIG. 2B is an operating mode table depicting some of the operating characteristics of the powertrain shown in FIG. 2A.

With reference to FIG. 2A, a powertrain drive 12 is shown. The engine 18 is operably connected to the ring gear of the first PG mechanism 20, while electric motor 14 is connected to the sun gear of the first PG mechanism 20 and motor 16 is connected to the ring gear of a second PG mechanism 22.

Dynamic clutch 36 collocates with the carrier of the first PG mechanism 20 and the carrier of the second PG mechanism 22. Dynamic clutch 38 collocates with the sun gear of the first PG mechanism 20 and the sun gear of the second PG mechanism 22. Brake clutch 40 collocates with the carrier of the first PG mechanism 20. Sun gear of the second PG mechanism 22 outputs to the front wheels 32, while the ring gear of the second PG mechanism 22 outputs to the rear wheels 34. Status of dynamics clutches 36 and 38, together with a brake clutch 40, define the operating mode of this system. The operating mode table is presented in FIG. 2B.

The present teaching employs a power-split mode if clutch 36 is engaged while the other two clutches 38, 40 are disengaged. The engine 18 and motor 14 together drive drive the front wheels 32 and rear wheels 34. The motor 16 controls/adjusts output of the rear wheels 34, since they are directly collocated. Generally, rotational speed of the two output shafts 24 and 26 are the same. Rotational speed of the engine 18 can vary depending on the desired controlled operation.

The present teaching also employs a pure electric mode if clutch 38 is engaged while the other two clutches 36, 40 are disengaged. The motor 14 drives the front wheels 32 directly while the motor 16 controls the rear wheels 34. The engine 18 speed is free from wheel speeds and can be shut down. The vehicle is purely driven by two electric motors 14, 16 with AWD, and thus it operates as an electric vehicle.

The present teaching also employs a series mode with rear-wheel-drive (RWD) if clutch 40 is engaged, while clutch 36 and 38 are disengaged. The motor 16 controls/adjusts output of the rear wheels 34. The motor 14 is connected to the engine 18 and is operating as a generator generating electricity from the engine power.

The present teaching also employs a parallel mode if clutches 36 and 38 are engaged, while clutch 40 is disengaged. All the power components, the engine 18 and electric motors 14 and 16, are driving the two output shafts 24 and 26, and these components have the same rotational speed as the two output shafts. The operating status of the engine 18 can change by varying its acting torque. The vehicle operates like a parallel hybrid in this mode.

The present teaching also employs an operating mode that the vehicle can drive backward while the engine 18 is on. Brake clutch 40 and clutch 38 are engaged, and clutch 36 is disengaged. The engine 18 and motor 14 are driving the front wheels 32. In the driving backward case, the engine 18 still rotates in the positive direction because of the engagement of the brake clutch 40, even when the front wheels 32 has negative rotational speed. The motor 16 drives the rear wheels 34 respectively.

Description of a Third Exemplary Embodiment

Figures 3A, 3B:
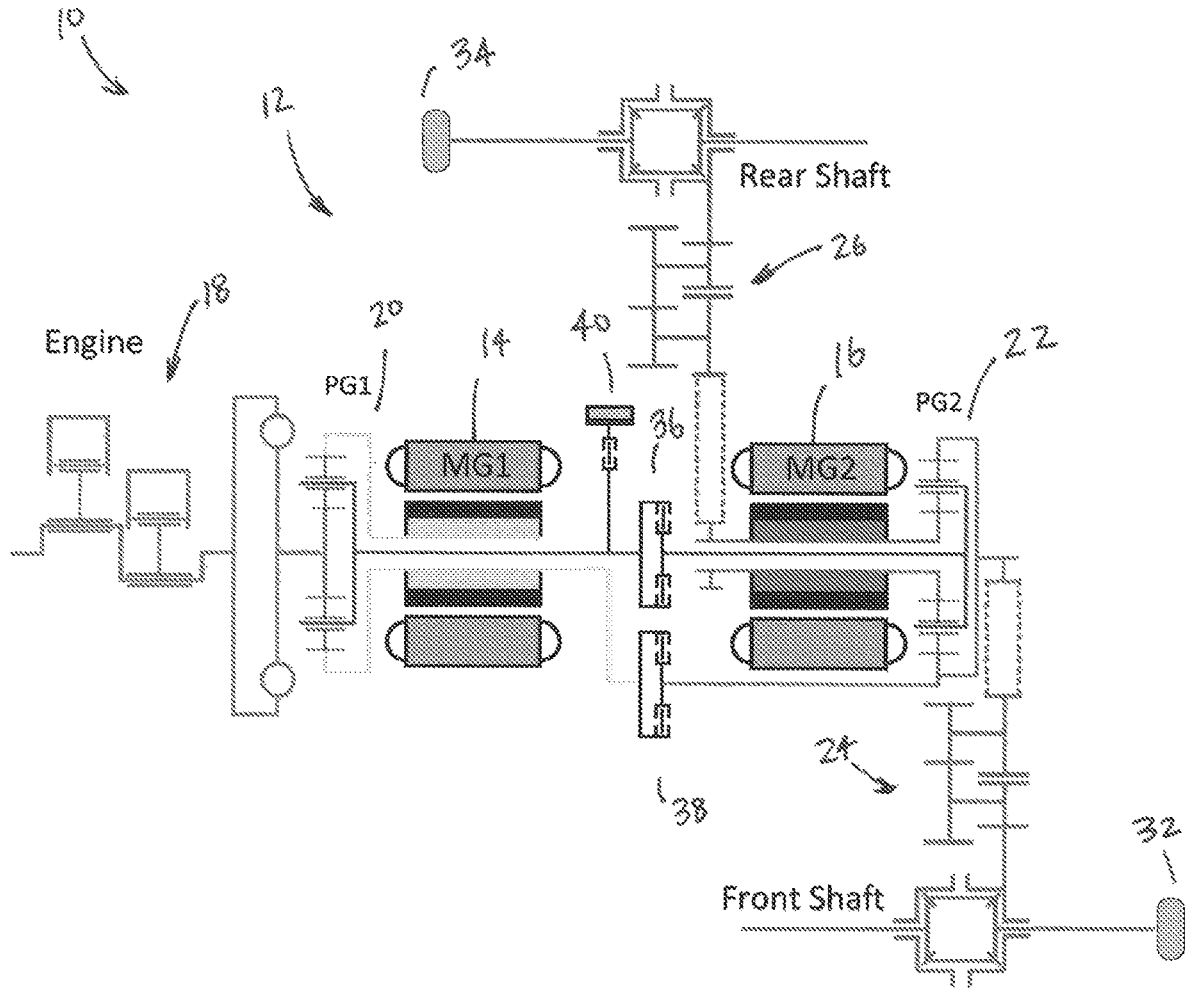
FIG. 3A is a schematic representation of a powertrain including an All-Wheel-Drive (AWD) multi-mode power-split design incorporating a family member of the present invention.
FIG. 3B is an operating mode table depicting some of the operating characteristics of the powertrain shown in FIG. 3A.

With reference to FIG. 3A, a powertrain drive 12 is shown. The engine 18 is operably connected to the sun gear of a first PG mechanism 20, while electric motor 14 is connected to the ring gear of the first PG mechanism 20 and motor 16 is connected to the sun gear of a second PG mechanism 22.

Dynamic clutch 36 collocates with the carrier of the first PG mechanism 20 and the carrier of the second PG mechanism 22. Dynamic clutch 38 collocates with the ring gear of the first PG mechanism 20 and the ring gear of the second PG mechanism 22. Brake clutch 40 collocates with the carrier of the first PG mechanism 20. Ring gear of the second PG mechanism 22 outputs to the front wheels 32, while the sun gear of the second PG mechanism 22 outputs to the rear wheels 34. Status of dynamics clutches 36 and 38, together with a brake clutch 40, define the operating mode of this system. The operating mode table is presented in FIG. 3B.

The present teaching employs a power-split mode if clutch 36 is engaged while the other two clutches 38, 40 are disengaged. The engine 18 and motor 14 together drive the front wheels 32 and rear wheels 34. The motor 16 controls/adjusts output of the rear wheels 34, since they are directly collocated. Generally, rotational speed of the two output shafts 24 and 26 are the same. Rotational speed of the engine 18 can vary depending on the desired controlled operation.

The present teaching also employs a pure electric mode if clutch 38 is engaged while the other two clutches 36, 40 are disengaged. The motor 14 drives the front wheels 32 directly while the motor 16 controls the rear wheels 34. The engine 18 speed is free from wheel speeds and can be shut down. The vehicle is purely driven by two electric motors 14, 16 with AWD, and thus it operates as an electric vehicle.

The present teaching also employs a series mode with rear-wheel-drive (RWD) if clutch 40 is engaged, while clutch 36 and 38 are disengaged. The motor 16 controls/adjusts output of the rear wheels 34. The motor 14 is connected to the engine 18 and is operating as a generator generating electricity from the engine power.

The present teaching also employs a parallel mode if clutches 36 and 38 are engaged, while clutch 40 is disengaged. All the power components, the engine 18 and electric motors 14 and 16, are driving the two output shafts 24 and 26, and these components have the same rotational speed as the two output shafts. The operating status of the engine 18 can change by varying its acting torque. The vehicle operates like a parallel hybrid in this mode.

The present teaching also employs an operating mode that the vehicle can drive backward while the engine 18 is on. Brake clutch 40 and clutch 38 are engaged, and clutch 36 is disengaged. The engine 18 and motor 14 are driving the front wheels 32. In the driving backward case, the engine 18 still rotates in the positive direction because of the engagement of the brake clutch 40, even when the front wheels 32 has negative rotational speed. The motor 16 drives the rear wheels 34 respectively.

Description of a Forth Exemplary Embodiment

Figures 4A, 4B:
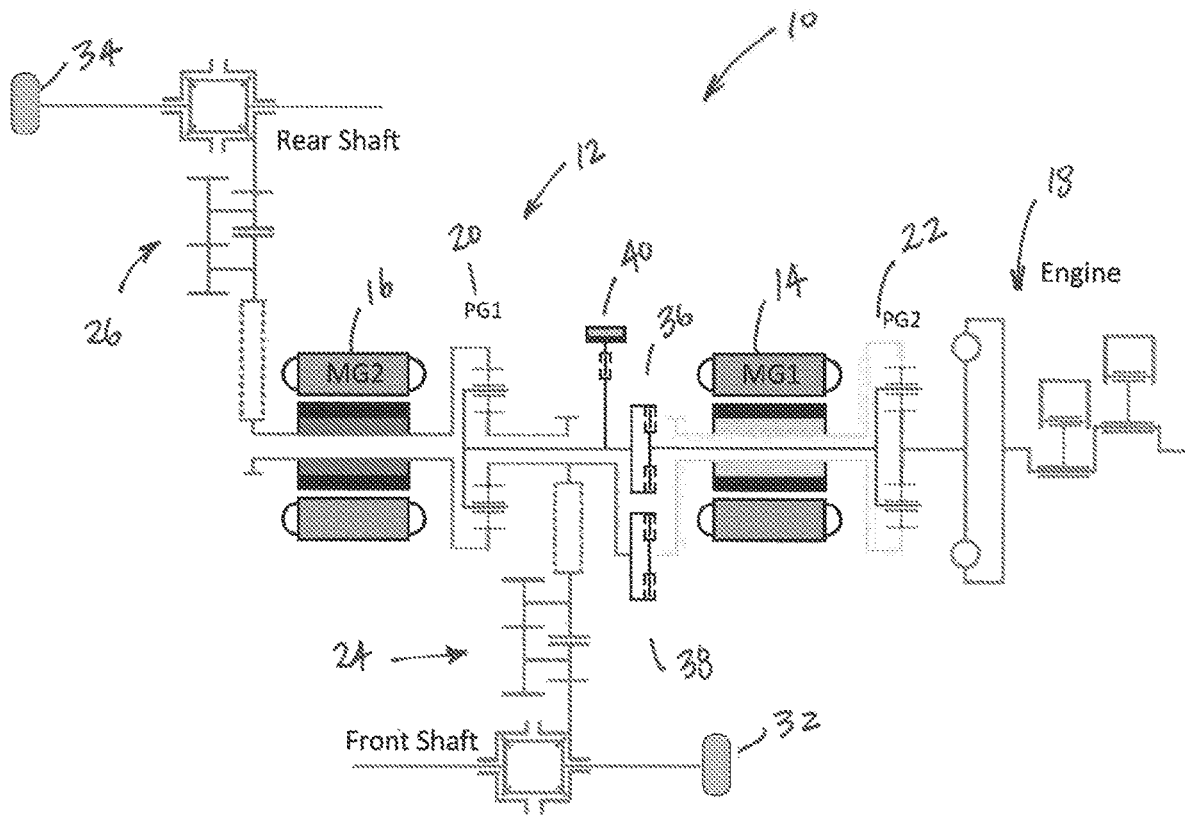
FIG. 4A is a schematic representation of a powertrain including an All-Wheel-Drive (AWD) multi-mode power-split design incorporating a family member of the present invention.
FIG. 4B is an operating mode table depicting some of the operating characteristics of the powertrain shown in FIG. 4A.

With reference to FIG. 4A, a powertrain drive 12 is shown. The engine 18 is operably connected to the sun gear of a second PG mechanism 22, while electric motor 14 is connected to the ring gear of the second PG mechanism 22 and motor 16 is connected to the ring gear of a first PG mechanism 20.

Dynamic clutch 36 collocates with the carrier of the first PG mechanism 20 and the carrier of the second PG mechanism 22. Dynamic clutch 38 collocates with the sun gear of the first PG mechanism 20 and the ring gear of the second PG mechanism 22. Brake clutch 40 collocates with the carrier of the first PG mechanism 20. Sun gear of the first PG mechanism 20 outputs to the front wheels 32, while the ring gear of the first PG mechanism 20 outputs to the rear wheels 34. Status of dynamics clutches 36 and 38, together with a brake clutch 40, define the operating mode of this system. The operating mode table is presented in FIG. 4B.

The present teaching employs a power-split mode if clutch 36 is engaged while the other two clutches 38, 40 are disengaged. The engine 18 and motor 14 together drive the front wheels 32 and rear wheels 34. The motor 16 controls/adjusts output of the rear wheels 34, since they are directly collocated. Generally, rotational speed of the two output shafts 24 and 26 are the same. Rotational speed of the engine 18 can vary depending on the desired controlled operation.

The present teaching also employs a pure electric mode if clutch 38 is engaged while the other two clutches 36, 40 are disengaged. The motor 14 drives the front wheels 32 directly while the motor 16 controls the rear wheels 34. The engine 18 speed is free from wheel speeds and can be shut down. The vehicle is purely driven by two electric motors 14, 16 with AWD, and thus it operates as an electric vehicle.

The present teaching also employs a series mode with rear-wheel-drive (RWD) if clutch 40 is engaged, while clutch 36 and 38 are disengaged. The motor 16 controls/adjusts output of the rear wheels 34. The motor 14 is connected to the engine 18 and is operating as a generator generating electricity from the engine power.

The present teaching also employs a parallel mode if clutches 36 and 38 are engaged, while clutch 40 is disengaged. All the power components, the engine 18 and electric motors 14 and 16, are driving the two output shafts 24 and 26, and these components have the same rotational speed as the two output shafts. The operating status of the engine 18 can change by varying its acting torque. The vehicle operates like a parallel hybrid in this mode.

The present teaching also employs an operating mode that the vehicle can drive backward while the engine 18 is on. Brake clutch 40 and clutch 38 are engaged, and clutch 36 is disengaged. The engine 18 and motor 14 are driving the front wheels 32. In the driving backward case, the engine 18 still rotates in the positive direction because of the engagement of the brake clutch 40, even when the front wheels 32 has negative rotational speed. The motor 16 drives the rear wheels 34 respectively.

Description of a Fifth Exemplary Embodiment

Figures 5A, 5B:
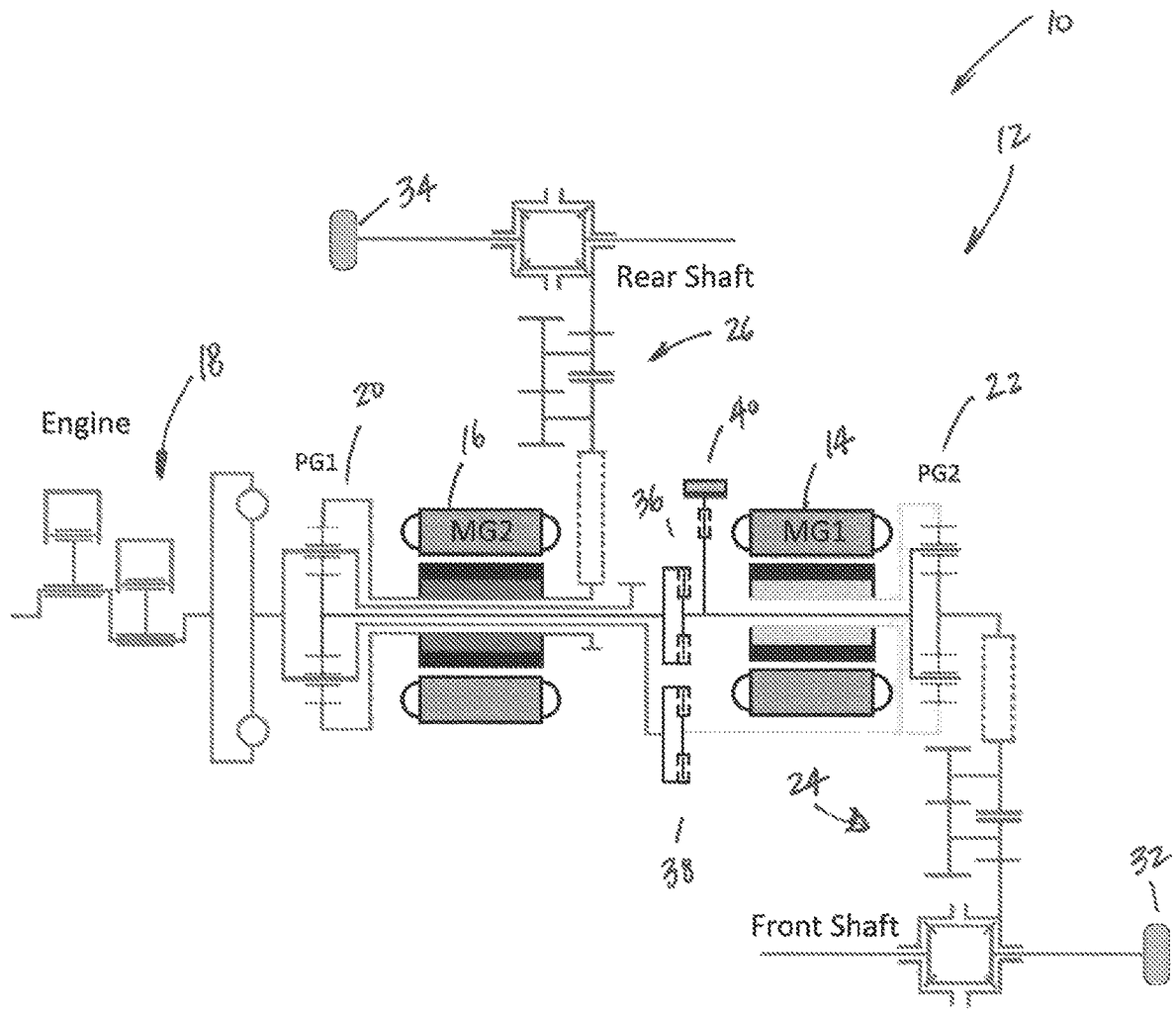
FIG. 5A is a schematic representation of a powertrain including an All-Wheel-Drive (AWD) multi-mode power-split design incorporating a family member of the present invention.
FIG. 5B is an operating mode table depicting some of the operating characteristics of the powertrain shown in FIG. 5A.

With reference to FIG. 5A, a powertrain drive 12 is shown. The engine 18 is operably connected to the carrier of a first PG mechanism 20, while electric motor 14 is connected to the ring gear of the second PG mechanism 22 and motor 16 is connected to the ring gear of a first PG mechanism 20.

Dynamic clutch 36 collocates with the sun gear of the first PG mechanism 20 and the carrier of the second PG mechanism 22. Dynamic clutch 38 collocates with the carrier of the first PG mechanism 20 and the ring gear of the second PG mechanism 22. Brake clutch 40 collocates with the carrier of the second PG mechanism 22. Sun gear of the second PG mechanism 22 outputs to the front wheels 32, while the ring gear of the first PG mechanism 20 outputs to the rear wheels 34. Status of dynamics clutches 36 and 38, together with a brake clutch 40, define the operating mode of this system. The operating mode table is presented in FIG. 5B.

The present teaching employs a power-split mode if clutch 36 is engaged while the other two clutches 38, 40 are disengaged. The engine 18 and motor 14 together drive the front wheels 32 and rear wheels 34. The motor 16 controls/adjusts output of the rear wheels 34, since they are directly collocated. Generally, rotational speed of the two output shafts 24 and 26 are the same. Rotational speed of the engine 18 can vary depending on the desired controlled operation.

The present teaching also employs a series mode with rear-wheel-drive (RWD) if clutch 38 is engaged, while clutches 36 and 40 are disengaged. The motor 16 controls/adjusts output of the rear wheels 34. The motor 14 is connected to the engine 18 and is operating as a generator generating electricity from the engine power.

The present teaching also employs a pure electric mode if clutch 40 is engaged while the other two clutches 36, 38 are disengaged. The motor 14 drives the front wheels 32 directly while the motor 16 controls the rear wheels 34. The engine 18 speed is free from wheel speeds and can be shut down. The vehicle is purely driven by two electric motors 14, 16 with AWD, and thus it operates as an electric vehicle.

The present teaching also employs a parallel mode if clutches 36 and 38 are engaged, while clutch 40 is disengaged. All the power components, the engine 18 and electric motors 14 and 16, are driving the two output shafts 24 and 26, and these components have the same rotational speed as the two output shafts. The operating status of the engine 18 can change by varying its acting torque. The vehicle operates like a parallel hybrid in this mode.

The present teaching also employs another parallel mode if clutches 36 and 40 are engaged, while clutch 38 is disengaged. The engine 18 and electric motor 16 are driving the rear wheels 34 with the engine to output speed ratio of 0.67. The electric motor 14 drives the front wheels 32. The operating status of the engine 18 can change by varying its acting torque.

The present teaching also employs an operating mode that the vehicle can drive backward while the engine 18 is on. Brake clutch 40 and clutch 38 are engaged, and clutch 36 is disengaged. The engine 18 and motor 14 are driving the front wheels 32. In this driving backward case, the engine 18 still rotates in the positive direction because of the engagement of the brake clutch 40, even when the front wheels 32 has negative rotational speed. The motor 16 drives the rear wheels 34 respectively.

Description of a Sixth Exemplary Embodiment

Figures 6A, 6B:
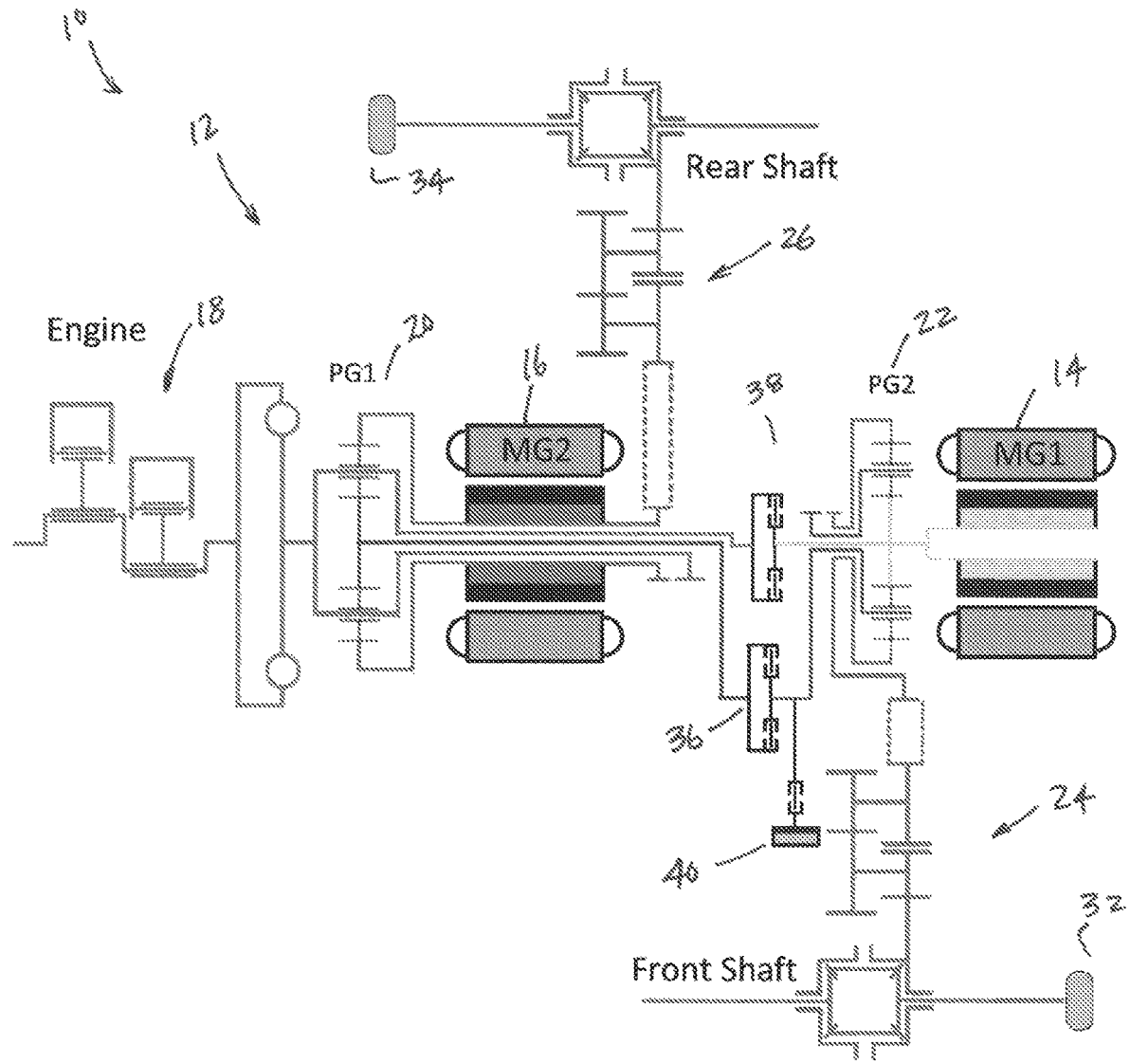
FIG. 6A is a schematic representation of a powertrain including an All-Wheel-Drive (AWD) multi-mode power-split design incorporating a family member of the present invention.
FIG. 6B is an operating mode table depicting some of the operating characteristics of the powertrain shown in FIG. 6A.

With reference to FIG. 6A, a powertrain driver 12 is shown. The engine 18 is operably connected to the carrier of a first PG mechanism 20, while electric motor 14 is connected to the sun gear of the second PG mechanism 22 and motor 16 is connected to the ring gear of a first PG mechanism 20.

Dynamic clutch 36 collocates with the sun gear of the first PG mechanism 20 and the carrier of the second PG mechanism 22. Dynamic clutch 38 collocates with the carrier of the first PG mechanism 20 and the sun gear of the second PG mechanism 22. Brake clutch 40 collocates with the carrier of the second PG mechanism 22. Ring gear of the second PG mechanism 22 outputs to the front wheels 32, while the ring gear of the first PG mechanism 20 outputs to the rear wheels 34. Status of dynamics clutches 36 and 38, together with a brake clutch 40, define the operating mode of this system. The operating mode table is presented in FIG. 6B.

The present teaching employs a power-split mode if clutch 36 is engaged while the other two clutches 38, 40 are disengaged. The engine 18 and motor 14 together drive the front wheels 32 and rear wheels 34. The motor 16 controls/adjusts output of the rear wheels 34, since they are directly collocated. Generally, rotational speed of the two output shafts 24 and 26 are the same. Rotational speed of the engine 18 can vary depending on the desired controlled operation.

The present teaching also employs a series mode with rear-wheel-drive (RWD) if clutch 38 is engaged, while clutches 36 and 40 are disengaged. The motor 16 controls/adjusts output of the rear wheels 34. The motor 14 is connected to the engine 18 and is operating as a generator generating electricity from the engine power.

The present teaching also employs a pure electric mode if clutch 40 is engaged while the other two clutches 36, 38 are disengaged. The motor 14 drives the front wheels 32 directly while the motor 16 controls the rear wheels 34. The engine 18 speed is free from wheel speeds and can be shut down. The vehicle is purely driven by two electric motors 14, 16 with AWD, and thus it operates as an electric vehicle.

The present teaching also employs a parallel mode if clutches 36 and 38 are engaged, while clutch 40 is disengaged. All the power components, the engine 18 and electric motors 14 and 16, are driving the two output shafts 24 and 26, and these components have the same rotational speed as the two output shafts. The operating status of the engine 18 can change by varying its acting torque. The vehicle operates like a parallel hybrid in this mode.

The present teaching also employs another parallel mode if clutches 36 and 40 are engaged, while clutch 38 is disengaged. The engine 18 and electric motor 16 are driving the rear wheels 34 with the engine to output speed ratio of 0.67. The electric motor 14 drives the front wheels 32. The operating status of the engine 18 can change by varying its acting torque.

The present teaching also employs an operating mode that the vehicle can drive backward while the engine 18 is on. Brake clutch 40 and clutch 38 are engaged, and clutch 36 is disengaged. The engine 18 and motor 14 are driving the front wheels 32. In this driving backward case, the engine 18 still rotates in the positive direction because of the engagement of the brake clutch 40, even when the front wheels 32 has negative rotational speed. The motor 16 drives the rear wheels 34 respectively.

Description of a Seventh Exemplary Embodiment

Figures 7A, 7B:
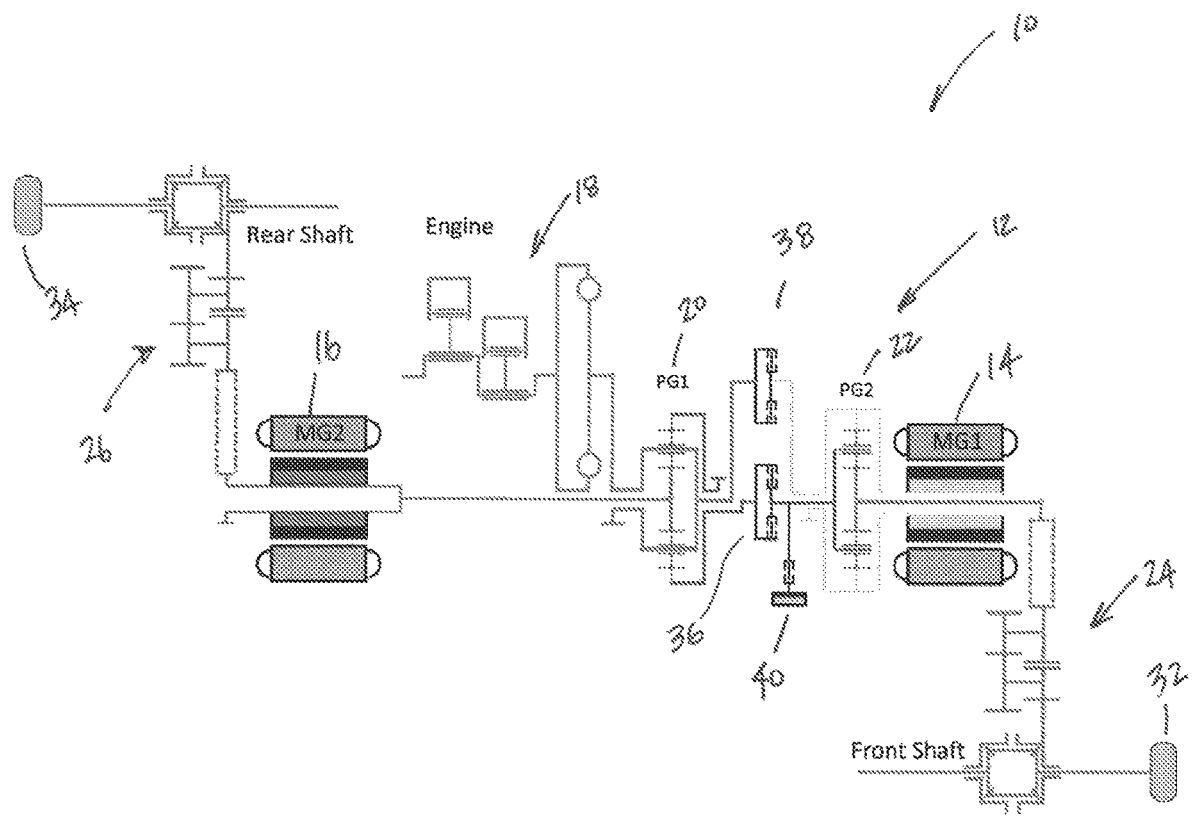
FIG. 7A is a schematic representation of a powertrain including an All-Wheel-Drive (AWD) multi-mode power-split design incorporating a family member of the present invention.
FIG. 7B is an operating mode table depicting some of the operating characteristics of the powertrain shown in FIG. 7A.

With reference to FIG. 7A, a powertrain drive 12 is shown. The engine 18 is operably connected to the carrier of a first PG mechanism 20, while electric motor 14 is connected to the ring gear of the second PG mechanism 22 and motor 16 is connected to the sun gear of a first PG mechanism 20.

Dynamic clutch 36 collocates with the ring gear of the first PG mechanism 20 and the carrier of the second PG mechanism 22. Dynamic clutch 38 collocates with the carrier of the first PG mechanism 20 and the ring gear of the second PG mechanism 22. Brake clutch 40 collocates with the carrier of the second PG mechanism 22. Sun gear of the second PG mechanism 22 outputs to the front wheels 32, while the sun gear of the first PG mechanism 20 outputs to the rear wheels 34. Status of dynamics clutches 36 and 38, together with a brake clutch 40, define the operating mode of this system. The operating mode table is presented in FIG. 7B.

The present teaching employs a power-split mode if clutch 36 is engaged while the other two clutches 38, 40 are disengaged. The engine 18 and motor 14 together drive the front wheels 32 and rear wheels 34. The motor 16 controls/adjusts output of the rear wheels 34, since they are directly collocated. Generally, rotational speed of the two output shafts 24 and 26 are the same. Rotational speed of the engine 18 can vary depending on the desired controlled operation.

The present teaching also employs a series mode with rear-wheel-drive (RWD) if clutch 38 is engaged, while clutches 36 and 40 are disengaged. The motor 16 controls/adjusts output of the rear wheels 34. The motor 14 is connected to the engine 18 and is operating as a generator generating electricity from the engine power.

The present teaching also employs a pure electric mode if clutch 40 is engaged while the other two clutches 36, 38 are disengaged. The motor 14 drives the front wheels 32 directly while the motor 16 controls the rear wheels 34. The engine 18 speed is free from wheel speeds and can be shut down. The vehicle is purely driven by two electric motors 14, 16 with AWD, and thus it operates as an electric vehicle.

The present teaching also employs a parallel mode if clutches 36 and 38 are engaged, while clutch 40 is disengaged. All the power components, the engine 18 and electric motors 14 and 16, are driving the two output shafts 24 and 26, and these components have the same rotational speed as the two output shafts. The operating status of the engine 18 can change by varying its acting torque. The vehicle operates like a parallel hybrid in this mode.

The present teaching also employs another parallel mode if clutches 36 and 40 are engaged, while clutch 38 is disengaged. The engine 18 and electric motors 16, are driving the rear wheels 34, with the engine to output speed ratio of 0.33. The electric motor 14 drives the front wheels 32. The operating status of the engine 18 can change by varying its acting torque.

The present teaching also employs an operating mode that the vehicle can drive backward while the engine 18 is on. Brake clutch 40 and clutch 38 are engaged, and clutch 36 is disengaged. The engine 18 and motor 14 are driving the front wheels 32. In this driving backward case, the engine 18 still rotates in the positive direction because of the engagement of the brake clutch 40, even when the front wheels 32 has negative rotational speed. The motor 16 drives the rear wheels 34 respectively.

Description of a Eighth Exemplary Embodiment

Figures 8A, 8B:
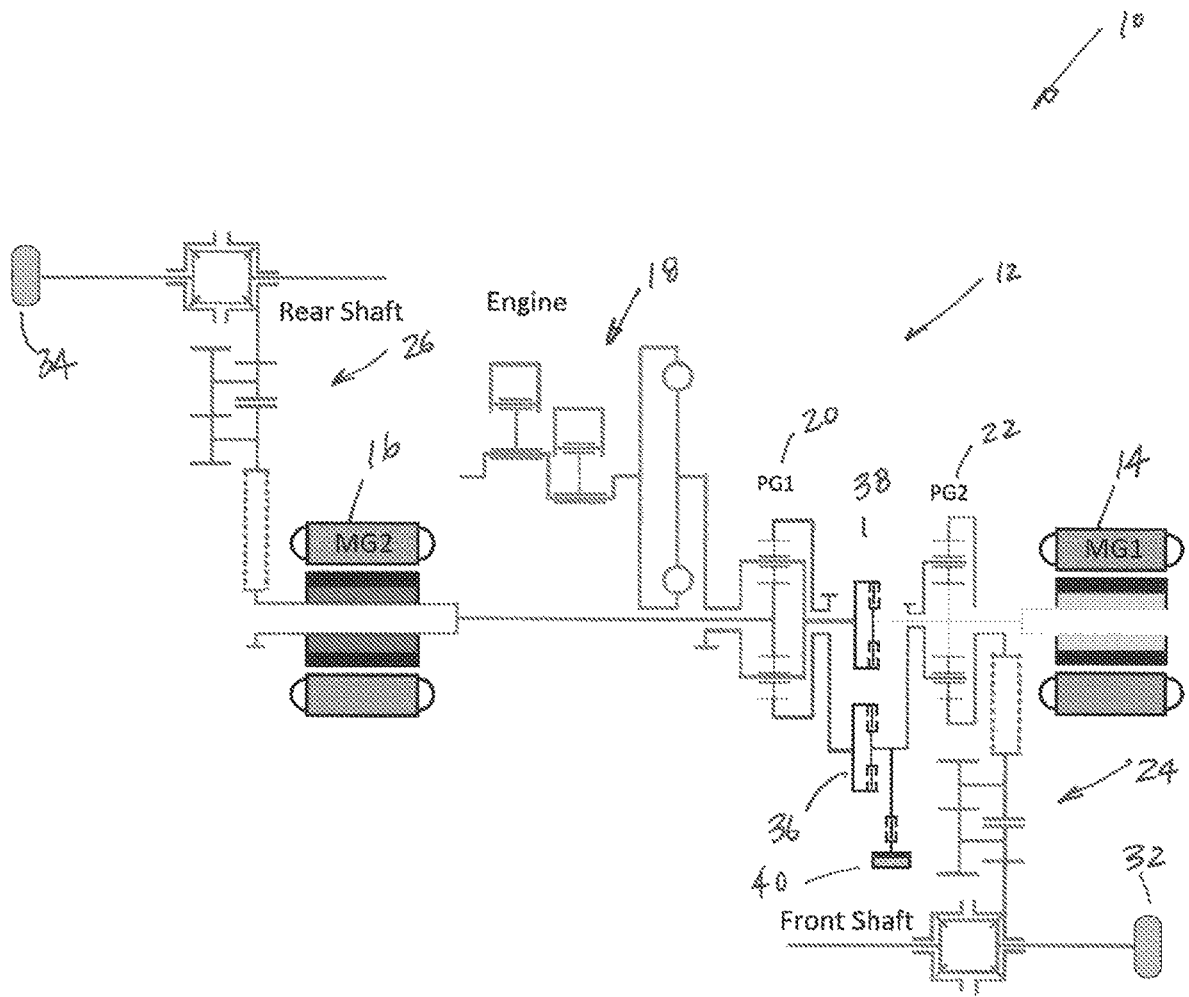
FIG. 8A is a schematic representation of a powertrain including an All-Wheel-Drive (AWD) multi-mode power-split design incorporating a family member of the present invention.
FIG. 8B is an operating mode table depicting some of the operating characteristics of the powertrain shown in FIG. 8A.

With reference to FIG. 8A, a powertrain drive 12 is shown. The engine 18 is operably connected to the carrier of a first PG mechanism 20, while electric motor 14 is connected to the sun gear of the second PG mechanism 22 and motor 16 is connected to the sun gear of a first PG mechanism 20.

Dynamic clutch 36 collocates with the ring gear of the first PG mechanism 20 and the carrier of the second PG mechanism 22. Dynamic clutch 38 collocates with the carrier of the first PG mechanism 20 and the sun gear of the second PG mechanism 22. Brake clutch 40 collocates with the carrier of the second PG mechanism 22. Ring gear of the second PG mechanism 22 outputs to the front wheels 32, while the sun gear of the first PG mechanism 20 outputs to the rear wheels 34. Status of dynamics clutches 36 and 38, together with a brake clutch 40, define the operating mode of this system. The operating mode table is presented in FIG. 8B.

The present teaching employs a power-split mode if clutch 36 is engaged while the other two clutches 38, 40 are disengaged. The engine 18 and motor 14 together drive the front wheels 32 and rear wheels 34. The motor 16 controls/adjusts output of the rear wheels 34, since they are directly collocated. Generally, rotational speed of the two output shafts 24 and 26 are the same. Rotational speed of the engine 18 can vary depending on the desired controlled operation.

The present teaching also employs a series mode with rear-wheel-drive (RWD) if clutch 38 is engaged, while clutches 36 and 40 are disengaged. The motor 16 controls/adjusts output of the rear wheels 34. The motor 14 is connected to the engine 18 and is operating as a generator generating electricity from the engine power.

The present teaching also employs a pure electric mode if clutch 40 is engaged while the other two clutches 36, 38 are disengaged. The motor 14 drives the front wheels 32 directly while the motor 16 controls the rear wheels 34. The engine 18 speed is free from wheel speeds and can be shut down. The vehicle is purely driven by two electric motors 14, 16 with AWD, and thus it operates as an electric vehicle.

The present teaching also employs a parallel mode if clutches 36 and 38 are engaged, while clutch 40 is disengaged. All the power components, the engine 18 and electric motors 14 and 16, are driving the two output shafts 24 and 26, and these components have the same rotational speed as the two output shafts. The operating status of the engine 18 can change by varying its acting torque. The vehicle operates like a parallel hybrid in this mode.

The present teaching also employs another parallel mode if clutches 36 and 40 are engaged, while clutch 38 is disengaged. The engine 18 and electric motor 16 are driving the rear wheels 34, with the engine to output speed ratio of 0.33. The electric motor 14 drives the front wheels 32. The operating status of the engine 18 can change by varying its acting torque.

The present teaching also employs an operating mode that the vehicle can drive backward while the engine 18 is on. Brake clutch 40 and clutch 38 are engaged, and clutch 36 is disengaged. The engine 18 and motor 14 are driving the front wheels 32. In this driving backward case, the engine 18 still rotates in the positive direction because of the engagement of the brake clutch 40, even when the front wheels 32 has negative rotational speed. The motor 16 drives the rear wheels 34 respectively.

Although not exemplary illustrated one by one, the present invention in FIG. 1 can be implemented in variously modified or altered forms based on the knowledge of those skilled in the art. For example, gear ratio of the PG mechanism 20 and 22 may vary, and size of components such as the engine 18 and motors 14 and 16 can be adjusted for different design requirements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid all-wheel drive system comprising:
a front wheel;
a rear wheel;
an internal combustion engine providing an output;
a first electric motor providing an output;
a second electric motor providing an output;
a pair of planetary-gear sets each having a ring gear, a sun gear, a plurality of pinion gears, and a carrier, each of the pair of planetary-gear sets being operably coupled to at least one of the internal combustion engine, first electric motor, and the second electric motor to transmit the output to at least one of the front wheel and the rear wheel;
a first dynamic clutch selectively coupling a first of the pair of planetary-gear sets to a second of the pair of planetary-gear sets;
a second dynamic clutch selectively coupling the first of the pair of planetary-gear sets to the second of the pair of planetary-gear sets; and
a brake clutch selectively collocating the carrier of one of the first and the second pair of planetary-gear sets,
wherein the engine is operably connected to the ring gear of the first of the pair of planetary-gear sets,
the first electric motor is operably coupled to the sun gear of the first of the pair of planetary-gear sets,
the second electric motor being operably coupled to the sun gear of the second of the pair of planetary-gear sets,
the ring gear of the second of the pair of planetary-gear sets transmitting output to the front wheel,
the sun gear of the second of the pair of planetary-gear sets transmitting output to the rear wheel.

2. The hybrid all-wheel drive system according to claim 1 wherein
the first dynamic clutch selectively couples the carrier of the first of the pair of planetary-gear sets to the carrier of the second of the pair of planetary-gear sets;
the second dynamic clutch selectively couples the sun gear of the first of the pair of planetary-gear sets to the ring gear of the second of the pair of planetary-gear sets; and
the brake clutch selectively collocating the carrier of the first of the pair of planetary-gear sets.

3. The hybrid all-wheel drive system according to claim 1 wherein the first dynamic clutch, the second dynamic clutch, and the brake clutch are selectively actuatable to couple the output of at least one of the engine, the first electric motor, and the second electric motor to at least one of the front wheel and the rear wheel to produce a power-split, all-wheel drive configuration.

4. The hybrid all-wheel drive system according to claim 1 wherein the first dynamic clutch, the second dynamic clutch, and the brake clutch are selectively actuatable to couple the output of at least one of the engine, the first electric motor, and the second electric motor to at least one of the front wheel and the rear wheel to produce a series, all-wheel drive configuration.

5. A hybrid all-wheel drive system comprising:
a front wheel;
a rear wheel;
an internal combustion engine providing an output;
a first electric motor providing an output;
a second electric motor providing an output;
a pair of planetary-gear sets each having a ring gear, a sun gear, a plurality of pinion gears, and a carrier, each of the pair of planetary-gear sets being operably coupled to at least one of the internal combustion engine, first electric motor, and the second electric motor to transmit the output to at least one of the front wheel and the rear wheel;

a first dynamic clutch selectively coupling a first of the pair of planetary-gear sets to a second of the pair of planetary-gear sets;

a second dynamic clutch selectively coupling the first of the pair of planetary-gear sets to the second of the pair of planetary-gear sets; and a brake clutch selectively collocating the carrier of one of the first and the second pair of planetary-gear sets, wherein the first dynamic clutch, the second dynamic clutch, and the brake clutch are selectively actuatable to couple the output of at least one of the engine, the first electric motor, and the second electric motor to at least one of the front wheel and the rear wheel to produce a power-split, all-wheel drive configuration.

6. The hybrid all-wheel drive system according to claim 1 wherein the first dynamic clutch, the second dynamic clutch, and the brake clutch are selectively actuatable to couple the output of at least one of the engine, the first electric motor, and the second electric motor to at least one of the front wheel and the rear wheel to produce a parallel, all-wheel drive configuration.

7. A hybrid all-wheel drive system comprising:
a front wheel;
a rear wheel;
an internal combustion engine providing an output;
a first electric motor providing an output;
a second electric motor providing an output;
a pair of planetary-gear sets each having a ring gear, a sun gear, a plurality of pinion gears, and a carrier, each of the pair of planetary-gear sets being operably coupled to at least one of the internal combustion engine, first electric motor, and the second electric motor to transmit the output to at least one of the front wheel and the rear wheel;
a first dynamic clutch selectively coupling a first of the pair of planetary-gear sets to a second of the pair of planetary-gear sets;
a second dynamic clutch selectively coupling the first of the pair of planetary-gear sets to the second of the pair of planetary-gear sets; and
a brake clutch selectively collocating the carrier of one of the first and the second pair of planetary-gear sets,
wherein the first dynamic clutch, the second dynamic clutch, and the brake clutch are selectively actuatable to couple the output of at least one of the engine, the first electric motor, and the second electric motor to at least one of the front wheel and the rear wheel to produce a series, all-wheel drive configuration.

* * * * *